(12) United States Patent  
Iwano

(10) Patent No.: US 10,456,988 B2  
(45) Date of Patent: Oct. 29, 2019

(54) JOINING STRUCTURE OF RESIN MEMBER FOR VEHICLE BODY AND STUD BOLT

(71) Applicant: TOYOTA JIDOSHA KABUSHIKI KAISHA, Toyota-shi (JP)

(72) Inventor: Yoshihiro Iwano, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 224 days.

(21) Appl. No.: 15/660,338

(22) Filed: Jul. 26, 2017

(65) Prior Publication Data

US 2018/0029303 A1 Feb. 1, 2018

(30) Foreign Application Priority Data

Jul. 29, 2016 (JP) .................................. 2016-150628

(51) Int. Cl.
*F16B 11/00* (2006.01)
*B29C 65/48* (2006.01)
(Continued)

(52) U.S. Cl.
CPC ...... *B29C 65/4845* (2013.01); *B29C 65/1406* (2013.01); *B29C 65/149* (2013.01);
(Continued)

(58) Field of Classification Search
CPC .... F16B 11/006; F16B 37/048; B29C 66/474; B29C 65/1406; B29C 65/4845;
(Continued)

(56) References Cited

U.S. PATENT DOCUMENTS 4,822,656 A * 4/1989 Hutter, III ........... B29C 65/7855  
156/247  
4,842,912 A * 6/1989 Hutter, III ............... B29C 65/02  
156/247  
(Continued)

FOREIGN PATENT DOCUMENTS

DE 10 2006 012 411 A1 4/2007  
DE 20 2016 100 499 U1 4/2016  
(Continued)

OTHER PUBLICATIONS

Office Action dated Mar. 9, 2018 in corresponding German Patent Application No. 10 2017 117 118.5 (with English Translation), citing documents AA, AO, AP, AQ and AX therein, 8 pages.  
(Continued)

*Primary Examiner* — Matthew R McMahon  
(74) *Attorney, Agent, or Firm* — Oblon, McClelland, Maier & Neustadt, L.L.P.

(57) ABSTRACT

There is provided a joining structure of a resin member for a vehicle body and a stud bolt that can more strongly fix a stud bolt to a resin member for a vehicle body by an ultraviolet curable adhesive. Convex portions are provided at a portion, which structures a flange-adjacent portion, of a mounting surface portion of a resin member for mounting. Therefore, a surface area of adhesion with adhesive at a place, which is covered by a flange portion as seen in a plan view, of the mounting surface portion can be made to be large. As a result, adhesive force of a portion, which is cured by diffused ultraviolet rays, of the adhesive A that is covered by the flange portion as seen in a plan view can be made to be large.

10 Claims, 8 Drawing Sheets

(51) Int. Cl.
| | |
|---|---|
| *B29C 65/00* | (2006.01) |
| *B29C 65/52* | (2006.01) |
| *F16B 37/04* | (2006.01) |
| *B29C 65/14* | (2006.01) |
| B29C 35/08 | (2006.01) |
| B29L 1/00 | (2006.01) |
| B60R 1/00 | (2006.01) |
| B29L 31/30 | (2006.01) |

(52) U.S. Cl.
CPC ............ *B29C 65/524* (2013.01); *B29C 66/10* (2013.01); *B29C 66/112* (2013.01); *B29C 66/1122* (2013.01); *B29C 66/131* (2013.01); *B29C 66/47* (2013.01); *B29C 66/474* (2013.01); *F16B 11/006* (2013.01); *F16B 37/048* (2013.01); *B29C 66/532* (2013.01); *B29C 66/7212* (2013.01); *B29C 2035/0827* (2013.01); *B29K 2995/0027* (2013.01); *B29L 2001/002* (2013.01); *B29L 2031/3055* (2013.01); *B60R 1/00* (2013.01)

(58) Field of Classification Search
CPC ....... B29C 2035/0827; B29L 2001/002; B29K 2995/0027
See application file for complete search history.

(56) References Cited

U.S. PATENT DOCUMENTS

| | | | | |
|---|---|---|---|---|
| 4,971,647 | A * | 11/1990 | Leslie | B23P 19/004 156/249 |
| 6,124,016 | A * | 9/2000 | Weil | B29C 37/0085 156/297 |
| 6,475,094 | B1 * | 11/2002 | Bruns | B29C 43/18 470/11 |
| 6,773,780 | B2 * | 8/2004 | Hutter, III | F16B 5/0208 403/267 |
| 8,920,901 | B2 * | 12/2014 | Sutherland | B29C 49/20 264/523 |
| 9,175,707 | B2 * | 11/2015 | Drüke | F16B 19/00 |
| 10,150,277 | B2 * | 12/2018 | Meer | B32B 7/10 |
| 10,232,574 | B2 * | 3/2019 | Liu | B29C 33/38 |
| 2002/0081952 | A1 * | 6/2002 | Fritz | B24B 45/00 451/56 |
| 2005/0167407 | A1 | 8/2005 | Chen et al. | |
| 2007/0114227 | A1 | 5/2007 | Stumpf et al. | |
| 2013/0336740 | A1 | 12/2013 | Drüke | |
| 2014/0374015 | A1 * | 12/2014 | Salnikov | F16B 19/00 156/275.5 |
| 2016/0201707 | A1 * | 7/2016 | Wood | F16B 35/06 403/267 |

FOREIGN PATENT DOCUMENTS

| | | |
|---|---|---|
| JP | S61-118232 | 6/1986 |
| JP | 2009-14094 A | 1/2009 |
| JP | 2013-199210 | 10/2013 |
| JP | 2013-205498 | 10/2013 |
| JP | 2014-509374 A | 4/2014 |
| JP | 2015-510457 | 4/2015 |
| WO | WO 2013/101831 A1 | 7/2013 |

OTHER PUBLICATIONS

"Onsert—Schnelles, prozesssicheres Fügen von Verbindungselementen mit lichthärtenden Klebstoffen", Böllhoff/Delo, Sep. 15, 2014, 10 pages.

* cited by examiner

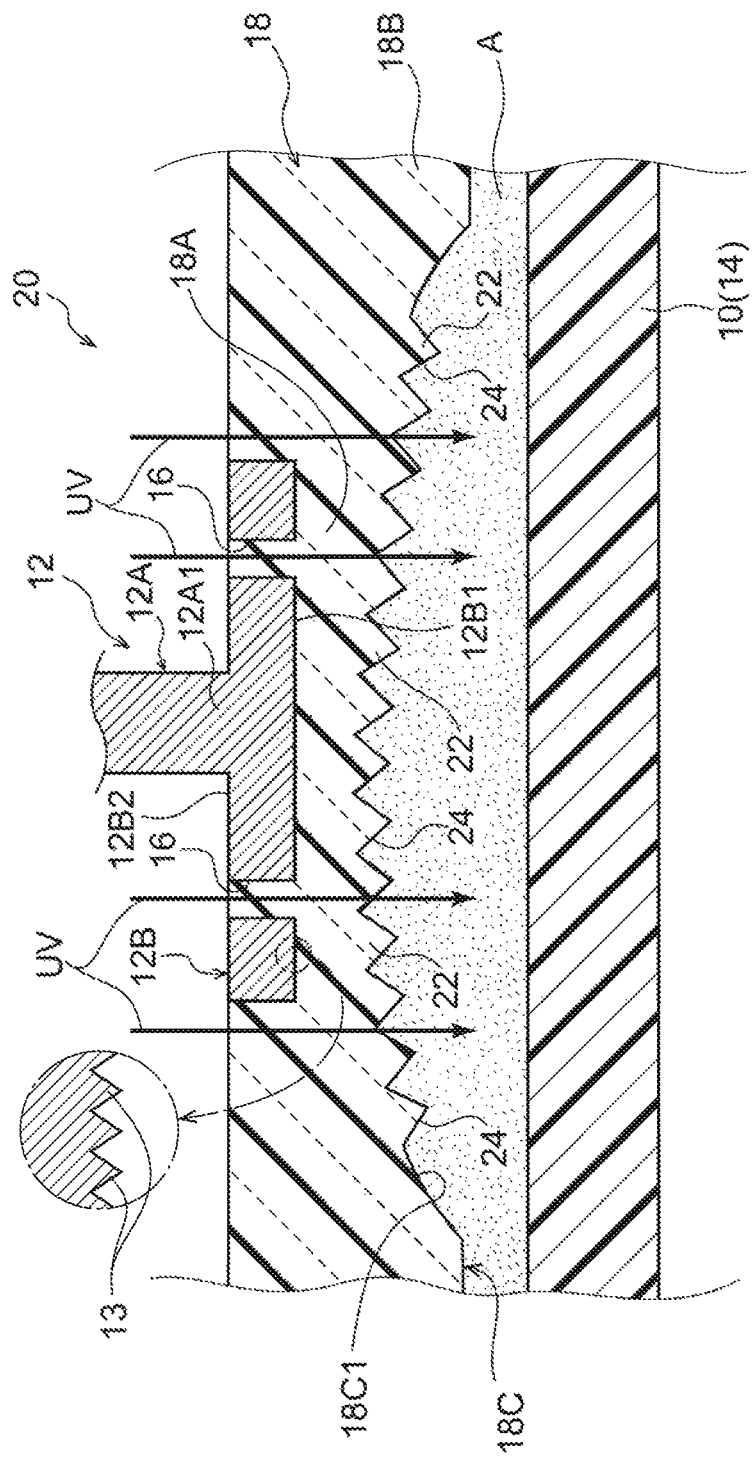

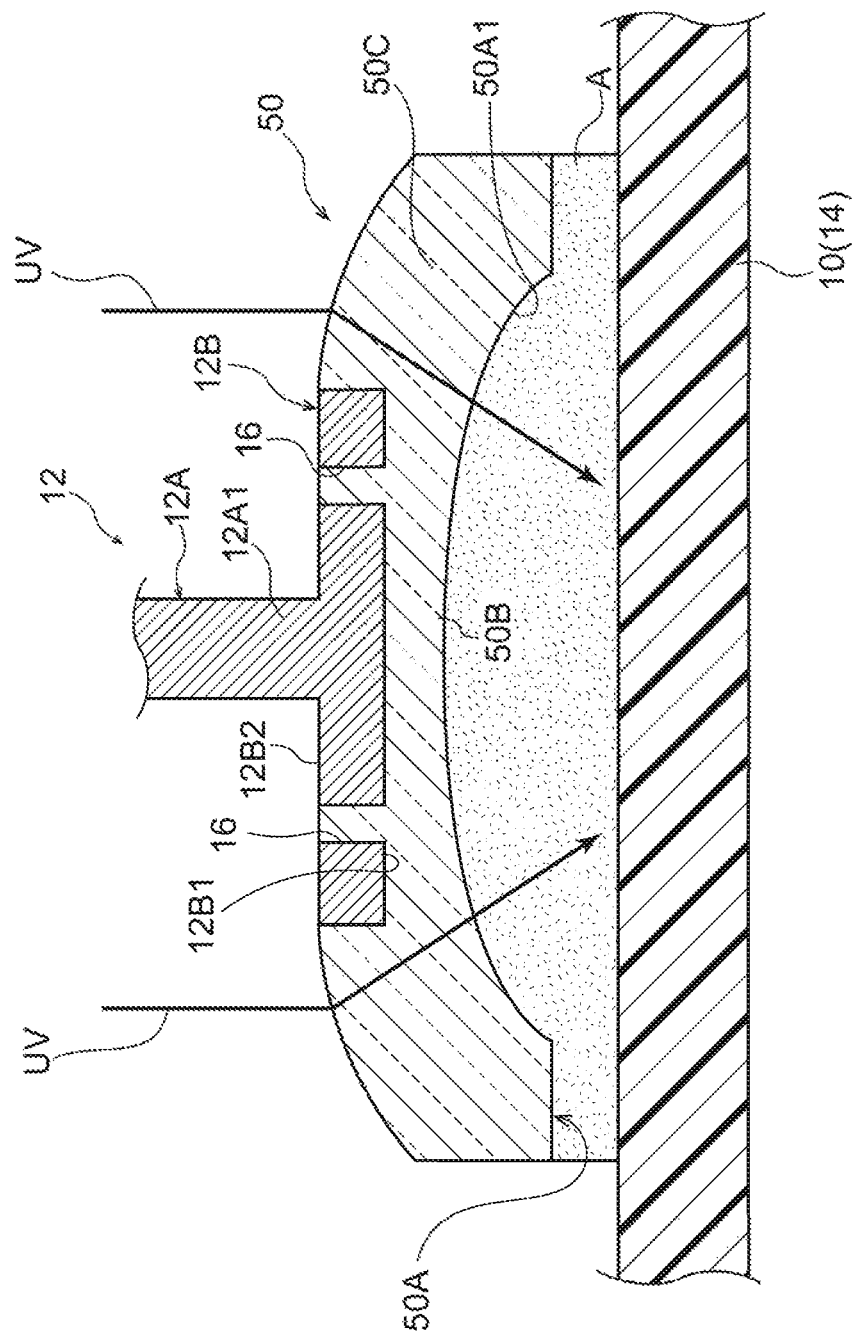

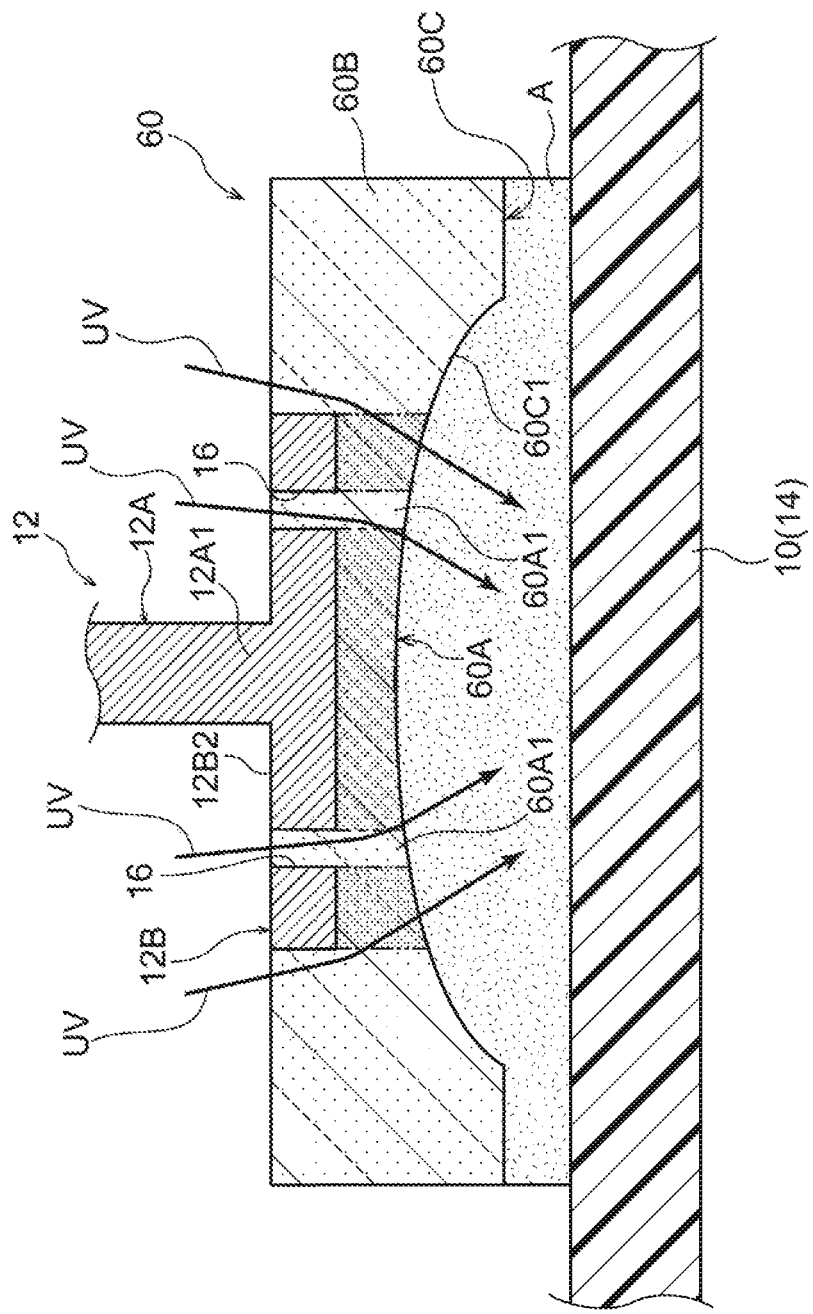

JOINING STRUCTURE OF RESIN MEMBER FOR VEHICLE BODY AND STUD BOLT

CROSS-REFERENCE TO RELATED APPLICATION

This application is based on and claims priority under 35 USC 119 from Japanese Patent Application No. 2016-150628 filed on Jul. 29, 2016, the disclosure of which is incorporated by reference herein.

BACKGROUND

Technical Field

The present disclosure relates to a joining structure of a resin member for a vehicle body and a stud bolt.

Related Art

Japanese Patent Application Laid-Open (JP-A) No. 2013-199210 (Patent Document 1) discloses an invention relating to a mounting structure of a wooden deck. In this mounting structure of a wooden deck, a mounting member that is structured to include a stud bolt, at which a male screw portion is formed, and a plate-shaped member, which is disc-shaped and is provided at an end portion of the stud bolt, is fixed by an adhesive to a base material that is made of metal. Therefore, in the prior art that is disclosed in Patent Document 1, the stud bolt can be mounted to the base material without carrying out welding. Further, this prior art can be applied also to vehicle bodies, and a stud bolt can be fixed to a resin member for a vehicle body by utilizing this prior art.

On the other hand, JP-A No. 2013-205498 (Patent Document 2) discloses an invention relating to an optical device. In this optical device, a glass substrate is fixed by an ultraviolet curable resin (an ultraviolet curable adhesive) to a holder that is made of metal, and the glass substrate can be adhered to the holder in a short time.

Here, it is thought to shorten the time required for fixing a mounting member by fixing the mounting member of the prior art relating to Patent Document 1 by using the ultraviolet curable resin of the prior art relating to Patent Document 2. However, even if an ultraviolet curable resin is applied between the base material and a plate-shaped member that is a portion of the mounting member, the ultraviolet rays that are irradiated toward the plate-shaped member are blocked-by the plate-shaped member, and therefore, the problem arises that it is difficult to cure the ultraviolet curable resin.

In view of the above, it has been thought to provide a resin member, which is plate-shaped and is structured of a transparent resin, integrally with the plate-shaped member that is a portion of the mounting member. In accordance with such a structure, when an ultraviolet curable resin is applied to the resin member and ultraviolet rays are irradiated from the resin member side, the ultraviolet rays are transmitted through the resin member and reach the ultraviolet curable resin. Therefore, the ultraviolet curable resin can be cured. As a result, the stud bolt can be fixed to the base material by using an ultraviolet curable resin.

However, even if a transparent resin member is provided at the mounting member at the time of curing the ultraviolet curable resin, i.e., at the time of irradiating the ultraviolet, rays, the ultraviolet rays are, as before, blocked by the plate-shaped member that is a portion of the mounting member. Therefore, at the place that is covered by the plate-shaped member as seen in a plan view, basically, the ultraviolet curable resin material cannot be cured. Further, even at the place that is covered by the plate-shaped member as seen in a plan view, some of the ultraviolet curable adhesive is cured by diffusion of the ultraviolet rays or the like, but there is room for improvement from the standpoint of more strongly fixing the stud bolt to the base material by an ultraviolet curable resin material. This is the same also in cases in which the stud bolt is to be fixed to a resin member for a vehicle body by an ultraviolet curable adhesive.

SUMMARY

In view of the above-described circumstances, an object of the present disclosure is to provide a joining structure of a resin member for a vehicle body and a stud bolt that can more strongly fix a stud bolt to a resin member for a vehicle body by an ultraviolet curable adhesive.

A joining structure of a resin member for a vehicle body and a stud bolt relating to a first aspect includes: a resin member for a vehicle body that structures a portion of a vehicle body; a stud bolt that is made of metal and is structured to include a shaft portion at which a male screw portion is formed, and a flange portion that is plate-shaped and is provided integrally with the shaft portion at one end portion of the shaft portion; and a resin member for mounting that includes a flange-adjacent portion, which is covered by the flange portion and is adjacent to a surface of the flange portion which surface is at a side opposite the shaft portion, and an extending portion, which is continuous with the flange-adjacent portion and extends-out from a peripheral edge portion of the flange portion as seen in a plan view, and that is formed of a resin through which ultraviolet rays can be transmitted and is provided integrally with the flange portion, and a mounting surface portion, which is provided at a side opposite the stud bolt, of the resin member for mounting is joined via an ultraviolet curable adhesive to the resin member for a vehicle body, and at least one of concave portions and convex portions are provided at a portion, which structures the flange-adjacent portion, of the mounting surface portion.

In accordance with the first aspect, the stud bolt that is made of melt structured include the shall portion at which a male screw portion is formed, and the flange portion that is plate-shaped and is provided integrally with the shall portion at one end portion of the shaft portion. The resin member for mounting is provided integrally with the flange portion. The resin member for mounting is structured of a resin through which ultraviolet rays can be transmitted, and includes the flange-adjacent portion, which is covered by the flange portion and is adjacent to the surface of the flange portion which surface is at the side opposite the shaft portion, and an extending portion that is continuous with the flange-adjacent portion and extends-out from the peripheral edge portion of the flange portion as seen in a plan view. Further, the mounting surface portion, which is provided at the side opposite the stud bolt at the resin member for mounting, is joined to the resin member for a vehicle body via an ultraviolet curable adhesive. The stud bolt is thereby fixed to the resin member for a vehicle body.

By the way, in a case of employing a structure such as described above when the ultraviolet curable adhesive is to be cured, ultraviolet rays are irradiated from the stud bolt side. However, most of the ultraviolet rays that are irradiated toward the flange portion of stud bolt are blocked by the flange portion. Therefore, it is thought that an uncured portion will arise at the ultraviolet curable adhesive that is covered by the flange portion of the stud bolt as seen in a plan view. On the other hand, some of the ultraviolet rays that are irradiated toward the flange portion are diffused and reach the ultraviolet curable adhesive that is covered by the flange portion, and of this ultraviolet curable adhesive is cured.

Here, in the first aspect, at least one of concave portions and convex portions are provided at the portion, which structures the flange-adjacent portion, of the mounting surface portion of the resin member for mounting. Therefore, the surface area of adhesion with the ultraviolet curable adhesive can be made large at the place, which is covered by the flange portion as seen in a plan view, of the mounting surface portion. As a result, the adhesive force of the portion, which has been cured by diffused ultraviolet rays, of the ultraviolet curable adhesive that is covered by the flange portion of the stud bolt as seen in a plan view can be made to be large.

A joining structure of a resin member for a vehicle body and a stun bolt relating to a second aspect includes: resin member for a vehicle body that structures a portion of a vehicle body; a stud bolt that is made of metal and is structured to include a shaft portion at which a male screw portion is formed, and a flange portion that is plate-shaped and is provided integrally with the shaft portion at one end portion of the shaft portion, and plural through portions are formed in the flange portion; and a resin member for mounting that includes a flange-adjacent portion, which is covered by the flange portion and is adjacent to a surface of the flange portion which surface is at a side opposite the shaft portion, and an extending portion, which is continuous with the flange-adjacent portion and extends-out front a peripheral edge portion of the flange portion as seen in a plan view, and that is formed of a resin through which ultraviolet rays can be transmitted and is provided integrally with the flange portion, and a mounting surface portion, which is provided at a side opposite the stud bolt, of the resin member for mounting is joined via an ultraviolet curable adhesive to the resin member for a vehicle body.

In accordance with the second aspect, in the same way as in the first aspect, the resin member for mounting is provided integrally with the flange portion at the flange portion of the stud bolt that is made of metal. Further, the stud bolt is fixed to a resin member for a vehicle body due to the mounting surface portion of the resin member for mounting being joined to the resin member for a vehicle body via an ultraviolet curable adhesive. Namely, there is a state in which, as seen in a plan view, a portion of the ultraviolet curable adhesive is covered by the flange portion of the stud bolt.

By the way, ensuring paths over which ultraviolet rays reach the ultraviolet curable adhesive is effective in curing the ultraviolet curable adhesive that is covered by the flange portion of the stud bolt.

Here, in the second aspect, the plural through portions are formed in the flange ion of the stud bolt. The ultraviolet rays that are irradiated toward the flange portion pass-through the through portions and reach the ultraviolet curable adhesive. Therefore, in the present invention, paths of ultraviolet rays to the ultraviolet curable adhesive are ensured, and more of the ultraviolet curable adhesive, which is covered by the flange portion as seen a plan view, can be cured.

In a joining structure of a resin member for a vehicle body and a stud bolt relating to a third aspect, in the second aspect, at least one of concave portions and convex portions are provided at a portion, which structures the flange-adjacent portion, of the mounting surface portion.

The third aspect is structured has similarly to the first aspect, and has similar operation. However, in the present invention, the adhesive force of the ultraviolet curable adhesive, which has been cured by the ultraviolet rays that have passed-through the plural through portions of the flange portion, can be made to be large.

In a joining structure of a resin member for a vehicle body and a stud bolt relating to a fourth aspect, in any one of the first through third aspects, a spherical concave portion, which is spherical and covers a range that overlaps at least the flange portion as seen in a plan view and whose peak portion is positioned at a position overlapping the shaft portion as seen in as plan view, is formed at the mounting surface portion, and plural hemispherical convex portions, which are hemispherical and convex toward a side of the resin member for a vehicle body, are provided at a position of the spherical concave portion which position overlaps the peripheral edge portion of the flange portion as seen in a plan view.

In accordance with the fourth aspect, a spherical concave portion that is spherical is formed at the mounting surface portion of the resin member for mounting. This spherical concave portion covers a range that overlaps at least the flange portion of the stud bolt as seen in a plan view, and the peak portion of the spherical concave portion is positioned at a position overlapping the shaft portion of the stud bolt is seen in a plan view. Therefore, in state in which the ultraviolet curable adhesive is applied to the mounting surface portion, it is easy for the ultraviolet curable adhesive to gather in the spherical concave portion. Further, the plural hemispherical convex portions, which are hemispherical and are convex toward the side of the resin member for a vehicle body, are provided at the spherical concave portion at a position that overlaps the peripheral edge portion of the flange portion as seen in a plan view. Therefore, the ultraviolet rays, which pass-through a vicinity of the peripheral edge portion of the flange portion, and the ultraviolet rays, which are diffused and are irradiated between the flange portion and the resin member for a vehicle, body, pass-through the hemispherical convex portions, and, due thereto, are converged toward the ultraviolet curable adhesive that gathers in the spherical concave portion.

In a joining structure of a resin member for a vehicle body and a stud bolt relating to a fifth aspect, in any one of the first through fourth aspects, the resin member for mounting is formed in a shape of a planoconvex lens that convex toward another end portion side of the shaft portion.

In accordance with the fifth aspect, the resin member for mounting functions, with respect to ultraviolet rays, as a planoconvex lens that is convex toward the other end portion side of the shaft portion of the stud bolt. Therefore, the ultraviolet rays that are irradiated onto the resin member for mounting are converged toward the ultraviolet curable adhesive that is covered by the flange portion of the stud bolt as seen in a plan view.

In as joining structure of a resin member for a vehicle body and a stud bolt relating to a sixth aspect, in any one of the first through fourth aspects, a density of resin that structures the resin member for mounting becomes higher from the extending portion side toward the flange-adjacent portion side.

In accordance with the sixth aspect, the density of the resin that structures the resin member for mounting increases from the extending portion side toward the flange-adjacent portion side. Note that, what is called density here means the mass per unit volume, in the present invention, the resin member for mounting is structured from different types of resins that are a resin at the extending portion side whose density is relatively low, and, a resin at the flange-adjacent portion side whose density is relatively high.

By the way, the density and the refractive index of a substance are proportional. When ultraviolet rays that advance through one substance advance through another substance whose density is higher than the one substance, the angle of incident of the ultraviolet rays becomes larger than the angle of refraction. Further, in the present invention, as described above, the density of the resin that structures the resin member for mounting increases from extending portion side toward the flange-adjacent portion side. Therefore, the ultraviolet rays, which are irradiated toward the extending portion side, advance while bending toward the flange-adjacent portion side. Therefore, in the present invention, the ultraviolet rays, which are irradiated toward the extending portion side of the resin member for mounting, are converged toward the ultraviolet curable adhesive that is covered by the flange portion of the stud bolt as seen in a plan view.

In a joining structure of a resin member for a vehicle body and a stud bolt relating to a seventh aspect, in any ogle of the first through sixth aspects, a mirror finish tape is affixed to a peripheral edge portion of the resin member for mounting with the flange adjacent portion side being a mirror finish side.

In accordance with the seventh aspect, a mirror finish tape is affixed to a peripheral edge portion of the resin member for mounting, and the mirror finish tape is disposed in a state in which the mirror finish side is at the flange-adjacent portion side of the resin member for mounting. Therefore, the ultraviolet rays, which are irradiated toward the peripheral edge portion side of the resin member for mounting, are reflected at the mirror finish tape, and are irradiated toward the ultraviolet curable adhesive that is covered by the flange portion of the stud bolt as seen in a plan view.

In a joining structure of a resin member for a vehicle body and a stud bolt relating to an eighth aspect, in any one of the first through seventh aspects, at least one of flange portion side concave portions and flange portion side convex portions are formed at joining surface portion, which is at a side of the resin member for mounting, of the flange portion.

In accordance with the eight aspect, at least one of flange portion side concave portions and flange portion side convex portions are formed at the joining surface portion, which is at the resin member for mounting side, of the flange portion of the stud bolt. Therefore, the joined surface area of the flange portion and the resin member for mounting can be made to be large.

As described above, the joining structure of a resin member for a vehicle body and a stud bolt relating to the first aspect can more strongly fix a stud bolt to a resin member for an vehicle body by an ultraviolet curable adhesive.

The joining structure a resin member for a vehicle body and a stud bolt relating to the second aspect can more strongly fix a stud bolt to a resin member for a vehicle body by an ultraviolet curable adhesive.

The joining structure of a resin member for a vehicle body and a stud bolt relating to the third aspect can aim for both suppression of the arising of an uncured portion of the ultraviolet curable adhesive and strengthening of the adhesive force of the ultraviolet curable adhesive.

The joining structure of a resin member for a vehicle body and a stud bolt relating to the fourth aspect can improve the accuracy of curing the ultraviolet curable adhesive that is covered by the flange portion of the stud bolt as seen in a plan view.

The joining structure of a resin member for a vehicle body and a stud bolt relating to the fifth aspect can suppress arising of an uncured portion of the ultraviolet curable adhesive, as compared with a case in which the resin member for mounting is formed in the shape of a flat plate or the like.

The joining structure of a resin member for a vehicle body and a stud bolt relating to the sixth aspect can suppress arising of an uncured portion of the ultraviolet curable adhesive, without changing shape of the resin member for mounting.

The joining structure of a resin member for a vehicle body and a stud bolt relating to the seventh aspect can, by a simple structure, increase the amount of ultraviolet rays that are irradiated onto the ultraviolet curable adhesive.

The joining structure a resin member vehicle and a stud bolt relating to the eighth aspect can make the joining of the stud bolt and the resin member for mounting more secure.

BRIEF DESCRIPTION OF THE DRAWINGS

FIG. 1 is an enlarged side sectional view (a side sectional view showing the state cut along line 1-1 of FIG. 3B) that shows the structure of a joining structure of a resin member for a vehicle body and a stud bolt relating to a first embodiment;

FIG. 2A shows a first step, FIG. 2B shows a second step.

FIG. 3A is a side sectional view of the joining structure and FIG. 3B is a plan view of the joining structure;

FIG. 5A is a side sectional view (a cross-sectional view corresponding to FIG. 1) of the joining structure, and FIG. 5B is a bottom view in which the joining structure is seen from the side of a resin member for a vehicle body;

FIG. 6 is a side sectional view (a cross-sectional view corresponding to FIG. 1) showing the structure of a joining structure of a resin member for a vehicle body and a stud bolt relating to a third embodiment; and FIG. 7 is a side sectional view (a cross-sectional view corresponding to FIG. 1) showing the structure of a joining structure of a resin member for a vehicle body and a stud bolt relating to a fourth embodiment.

DETAILED DESCRIPTION

First Embodiment

A first embodiment of a joining structure of a resin member for a vehicle body and a said bolt relating to the present invention is described hereinafter with reference to FIG. 1 through FIG. 3. As shown in these drawings, this joining structure of a resin member for a vehicle body and a stud bolt is used in the joining of a "resin member 10 for a vehicle body" (hereinafter called resin member 10) and a "stud bolt 12".

Figure 3A:
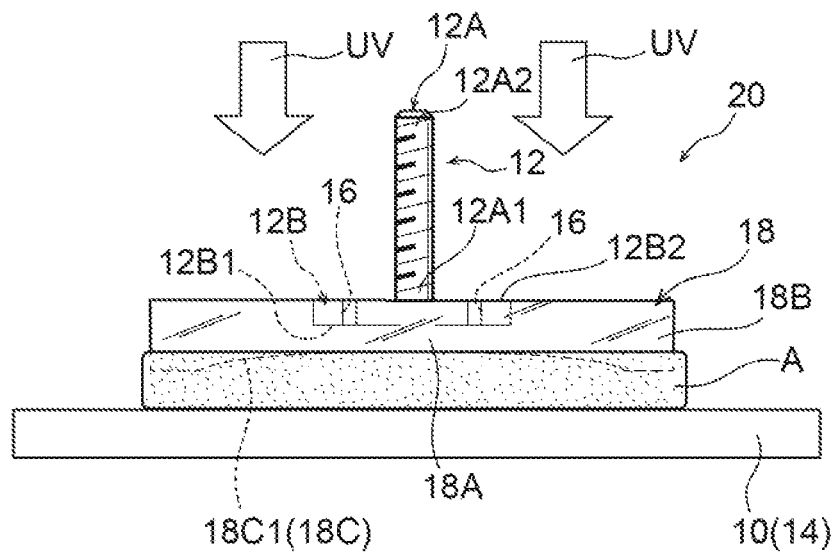
FIGS. 3A-3B illustrate the structure of the joining structure of a resin member for a vehicle body and a stud bolt relating to the first embodiment, where
Figure 3B:
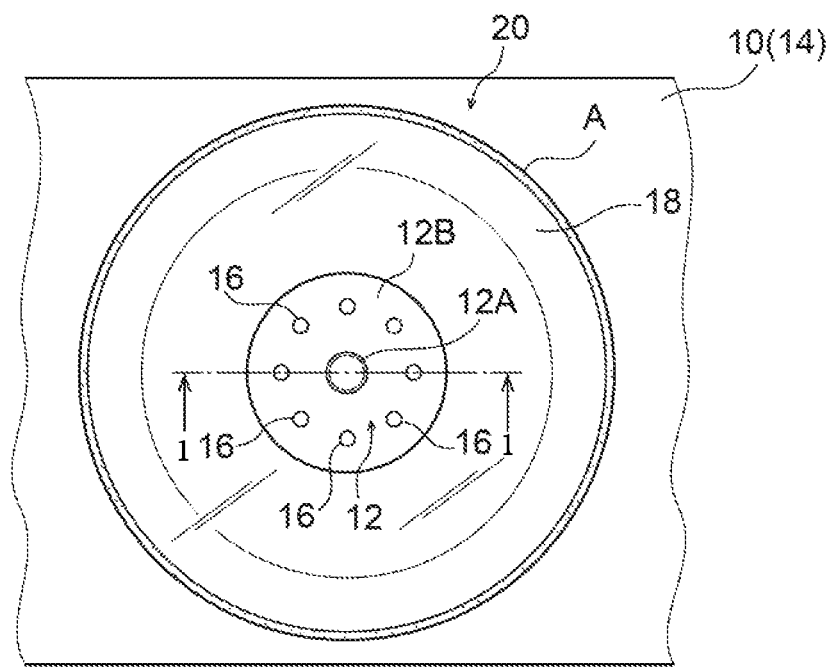

As shown in FIG. 3A and FIG. 3B the resin member 10 is a plate-shaped member that structures a portion of a vehicle body 14, for example, the spare tire housing of a vehicle body floor, or the like, and is formed of a carbon fiber reinforced plastic (CFRP) as an example. Note that the resin member 10 is not limited to this, and may be a member that is structured of another type of resin, or the like.

On the other hand, the stud bolt 12 is made of metal, and is structured to include a "shaft portion 12A" that is solid cylindrical and at which a male screw portion is formed, and a "flange portion 12B" that is disc-shaped in a plan view and is provided integrally with the shaft portion 12A at "one end portion 12A1" of the shaft portion 12A. Note that details of the flange portion 12B are described later. Further, here, "as seen in a plan view" means the state of viewing from the axial direction of the shaft portion 12A of the stud bolt 12, and the same holds hereinafter. Namely, the stud bolt 12 is not mounted only in a posture in which the axial direction of the shaft portion 12A is the vehicle vertical direction, and is mounted in any of various postures to the vehicle body 14.

Here, the present embodiment has a first feature in the point that plural "through portions 16" are formed in the flange portion 12B of the stud bolt 12. Further, there is a second feature in the structure of a "resin member 18 for mounting" that is provided integrally with the flange portion 12B. Further, there is a third feature in the point that the resin member 18 for mounting is joined to the resin member 10 via "ultraviolet curable adhesive (ultraviolet curable resin) A" thereinafter abbreviated as adhesive A).

Hereinafter, the flange portion 12B of the stud bolt 12, the resin member 18 for mounting and the adhesive A, which structure main portions of the present embodiment, are described in detail by using mainly FIG. 1.

First, the structure of the through portions 16 that are formed in the flange portion 12B is described by using FIG. 1 and FIG. 3. As shown in these drawings, the through portions 16 are formed circular shapes, and, as seen in a plan view, are formed in the flange portion 12B at a predetermined interval (a uniform interval) on the circumference of a circle of a predetermined diameter, e.g., a circle of a diameter whose length is around half of the diameter of the flange portion 12. Further, as shown in FIG. 3B, eight of the through portions 16 are formed at uniform intervals. Note that plural flange portion side convex portions 13 are formed at the surface portion, which is joined with the resin member 18 for mounting, of the flange portion 12B as shown in the partial enlarged view of FIG. 1 (the portion surrounded by the one-dot chain line).

On the other hand, the resin member 18 for mounting is structured of a transparent resin that allows transmittance of ultraviolet rays therethrough, such as polycarbonate or the like, and, as seen in a plan view, is formed in the shape of a plate that is circular and that is larger than the flange portion 12B of the stud bolt 12. This resin member 18 for mounting is made integral with the flange portion 12B by being insert molded with the flange portion 12B, and is structured to include a "flange-adjacent portion 18A" and an "extending portion 18B". In detail, the flange-adjacent portion 18A covers the flange portion 12B, and is provided so as to be adjacent to a surface 12B1, which is at the side opposite the shaft portion 12A, of the flange portion 12B. On the other hand, the extending portion 18B is continuous with the flange portion 18A and is provided in a state of extending-out from the flange-adjacent portion 18A as seen in a plan view. In the state in which the flange portion 12B is molded integrally with the resin member 18 for mounting, there is a state in which the resin that structures the resin member 18 for mounting is filled in the through portions 16, and there is a state in which a surface 12B2 that is at the opposite side of the surface 12B1 is exposed. Note that, in the following description, the integrally molded part of the stud bolt 12 and the resin member 18 mounting is called a mounting member 20.

Further, a "mounting surface portion 18C" that is used in mounting to the resin member 10 is provided at the side, which is opposite the stud bolt 12, of the resin member 18 for mounting. As shown in FIG. 3 as well, a "spherical conclave portion 18C1" is formed in the mounting surface portion 18C. This spherical concave portion 18C1 is spherical and covers at least the range that overlaps the flange portion 12B as seen in a plan view, and whose peak portion is positioned at a position overlapping the shall portion 12A as seen in a plan view. Namely, the spherical concave portion 18C1 is disposed mainly at the portion, which structures the flange-adjacent portion 18A, of the mounting surface portion 18C.

Moreover, plural "convex portions 22" are provided at the spherical concave portion 18C1 at the entire range thereof except for the peripheral edge portion thereof. These convex portions 22 are respectively formed in the shapes of triangular pyramids or quadrangular pyramids, and are distributed uniformly at the spherical concave portion 18C1. Note that, although the convex portions 22 are provided so as to be adjacent to one another, there are gaps between any given one of the convex portions 22 and the other convex portions 22, and this can also be interpreted as "concave portions 24" being formed in the mounting surface portion 18C. Further, the mounting surface portion 18C is joined to the resin member 10 via the adhesive A.

In an uncured state, the adhesive A is in the form of a gel, or the form of a liquid having a predetermined viscosity, and can be applied along the shape of the surface of the member that is the object of adhesion. Further, although the adhesive A is cured in a short time when irradiated by ultraviolet rays, the adhesive A remains in the gel form or the liquid form as described above provided that ultraviolet rays are not irradiated thereon.

Further, as shown in FIG. 2, an ultraviolet ray irradiator 26 is used in irradiating ultraviolet rays onto the adhesive A. The ultraviolet ray irradiator 26 is structured to include a main body portion 28 having a built-in irradiating portion that is not illustrated and that can irradiate ultraviolet rays, and a holding portion 30 that is shaped as a tube and that can hold the mounting member 20 in a state in which the mounting surface portion 18C thereof is the surface at the side opposite the main body portion 28. Note that mirror finishing is carried out on the inner peripheral surface of the holding portion 30.

Operation and Effects of Present Embodiment

Operation and effects of the present embodiment are described next.

Figure 2A:
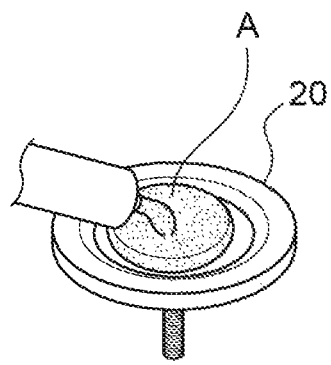
FIGS. 2A-2B illustrate steps of joining a resin member for a vehicle body and a stud bolt relating to the first embodiment, where

In the present embodiment, the mounting member 20 is joined to the resin member 10 through the joining steps that are shown in FIG. 2A through FIG. 2D. Concretely, first, as shown in FIG. 2A, in a first step, the adhesive A that is in an uncured state is applied to the spherical concave portion 18C1 of the resin member 18 for mounting.

Figure 2B:
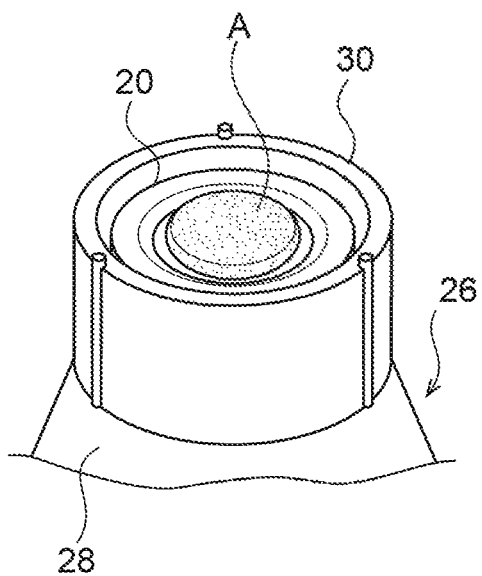

Next, as shown FIG. 2B, in a second step, the mounting member 20 is set at the holding portion 30 of the ultraviolet ray irradiator 26. At this time, there is a state in which there is a predetermined gap is formed it the length direction of the shaft portion 12A between the end portion of the holding portion 30 and the mounting surface portion 18C of the mounting member 20, as seen in a side view.

Figure 2C:
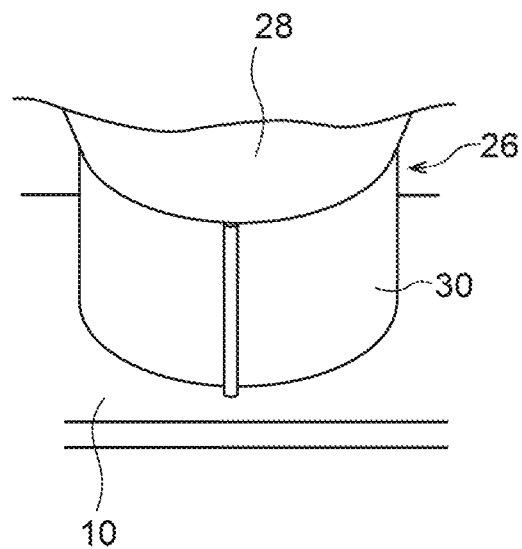
FIG. 2C shows a third step.

Next, as shown in FIG. 2C, in a third step, the mounting member 20 is disposed at a predetermined place of the resin member 10, and ultraviolet rays are irradiated for a predetermined time onto the adhesive A by the ultraviolet ray irradiator 26. Note as shown in FIG. 3A, ultraviolet rays UV are radiated from an another end portion (distal end portion) 12A2 side of the shaft portion 12A of the stud bolt 12, and pass-through the resin member 18 for mounting and reach the adhesive A. Further, mirror finishing is carried out on the inner peripheral surface of the holding portion 30, and the ultraviolet rays UV that are reflected at this inner peripheral surface also are irradiated onto the adhesive A.

Figure 2D:
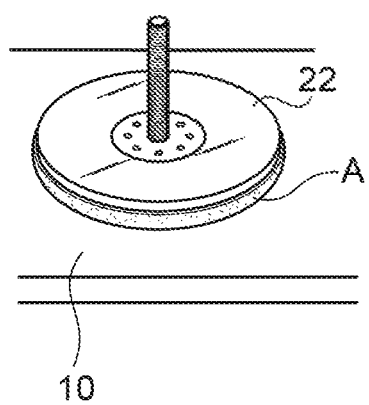
FIG. 2D shows a fourth step.

Finally, as shown in FIG. 2D, in a fourth step, the state in which the mounting member 20 is held by the ultraviolet ray irradiator 26 is cancelled, and the ultraviolet irradiator 26 is removed from the mounting member 20. Note that, if needed, the removal of burrs at the adhesive A, or the like, also is carried out. Then, the first step through the fourth step are repeated until the mounting members 20 are disposed at the necessary places.

In the joining structure of a resin member for a vehicle body and a stud bolt that is structured as described above, the stud bolt 12 that is made of metal is structured to include the shaft portion 12A at which a male screw portion is formed, and the flange portion 12B that is plate shaped and is provided integrally with the shaft portion 12A at the one end portion 12A1 of the shaft portion 12A. Further, the resin member 18 for mounting is provided integrally by integral molding with the flange portion 12B. The resin member 18 for mounting includes the flange-adjacent portion 18A and the extending portion 18B, and is structured from a resin that allows transmission of ultraviolet rays therethrough. In detail, the flange-adjacent portion 18A is covered by the flange portion 12B and is adjacent to the surface, which is at the side opposite the shaft portion 12A, of the flange portion 12B. The extending portion 18B is continuous with the flange-adjacent portion 18A, and, as seen in a plan view, extends-out from the peripheral edge portion of the flange portion 12B. Further, the stud bolt 12 is fixed to the resin member 10 due to the mounting surface portion 18C, which is provided at the opposite side of the stud bolt 12, at the resin member 18 for mounting being joined to the resin member 10, which structures a portion of the vehicle body 14, via the adhesive A that is cured by ultraviolet rays. Therefore, in the present embodiment, any of various members can be mounted to the resin member 10 via the stud bolt 12.

By the way, at the time of curing the adhesive A, as described above, the ultraviolet rays UV are irradiated from the stud bolt 12 side. At this time, if the through portions 16 are not formed in the flange portion 12B which is different than the case of the present embodiment, the majority of the ultraviolet rays UV that are irradiated toward the flange portion 12B are blocked by the flange portion 12B. Therefore, it is thought that an uncured portion will arise at the adhesive A that is covered by the flange portion 12B as seen in a plan view. On the other hand some of the ultraviolet rays UV that are irradiated toward the flange portion 12B are, regardless of the absence or presence of mirror finishing of the holding portion 30, diffused and reach the adhesive A that is covered by the flange portion 12B, and some of this adhesive A is cured.

Here, in the present embodiment, the concave portions 22 are provided at the portion, which structures the flange-adjacent portion 18A, of the mounting surface portion 18C of the resin member 18 for mounting. Therefore, the surface area of adhesion with the adhesive A can be made large at the place, which is covered by the flange portion 18A as seen in a plan view, of the mounting surface portion 18C. As a result, the adhesive force of the portion that has been cured by the diffused ultraviolet rays UV, among the adhesive A that is covered by the flange portion 12B as seen in a plan view, can be made to be large. Accordingly, in the present embodiment, the stud bolt 12 can be fixed more strongly to the resin member 10 by the adhesive A that is cured by the ultraviolet rays.

On the other hand, because the adhesive A is cured if the ultraviolet rays UV are irradiated, ensuring paths which the ultraviolet rays UV reach the adhesive A is effective in curing the adhesive A that is covered by the flange portion 12B of the stud bolt 12.

Here, in the present embodiment, the plural through portions 16 are formed in the flange portion 12B of the stud bolt 12. The ultraviolet rays UV that are irradiated toward the flange portion 12B pass-through the through portions 16 and reach the adhesive A. Therefore, in the present embodiment, paths of ultraviolet rays UV to the adhesive A are ensured, and more of the adhesive A, which is covered by the flange portion 12B as seen in a plan view, can be cured, and, as a result, the adhesive force, of the adhesive A can be made to be greater.

Moreover, in the present embodiment, the adhesive force of the adhesive A, which has been cured by the ultraviolet rays UV that have passed-through the plural through portions 16 of the flange portion 12B, can be made to be greater by the convex portions 22. Namely, in the present embodiment, both suppression of arising of an uncured portion of the adhesive A, and strengthening of the adhesive force of the adhesive A, can be achieved.

Further, in the present embodiment, the spherical concave portion 18C1 that is spherical is formed at the mounting surface portion 18C of the resin member 18 for mounting. This spherical concave portion 18C1 covers a range that overlaps at least the flange portion 12B of the stud bolt 12 as seen in a plan view, and the peak portion of this spherical concave portion 18C1 is positioned at a position overlapping the shaft portion 12A of the stud bolt 12. Therefore, in a state in which the adhesive A is applied to the mounting surface portion 18C, it is easy for the adhesive A to gather in the spherical concave portion 18C1, and the work of joining the mounting member 20 can be made to be efficient.

Moreover, in the present embodiment, because the flange portion side convex, portions 13 are formed at the joined surface portion, which is at the resin member 18 for mounting side, of the flange portion 12B of the stud bolt 12, the joined surface area of the flange portion 12B and the resin member 18 for mounting can be made to be large. As a result, the joining of the stud bolt 12 and the resin member 18 for mounting can be made to be more secure. Note that, in the present embodiment, the flange portion side convex portions 13 are provided at the surface portion, which is joined to the resin member 18 for mounting, of the flange portion 12B, but there may be a structure in which the surface area joining of the flange portion 12B and the resin member 18 for mounting is made large by providing flange portion side concave portions.

Modified Example of First Embodiment

Figure 4:
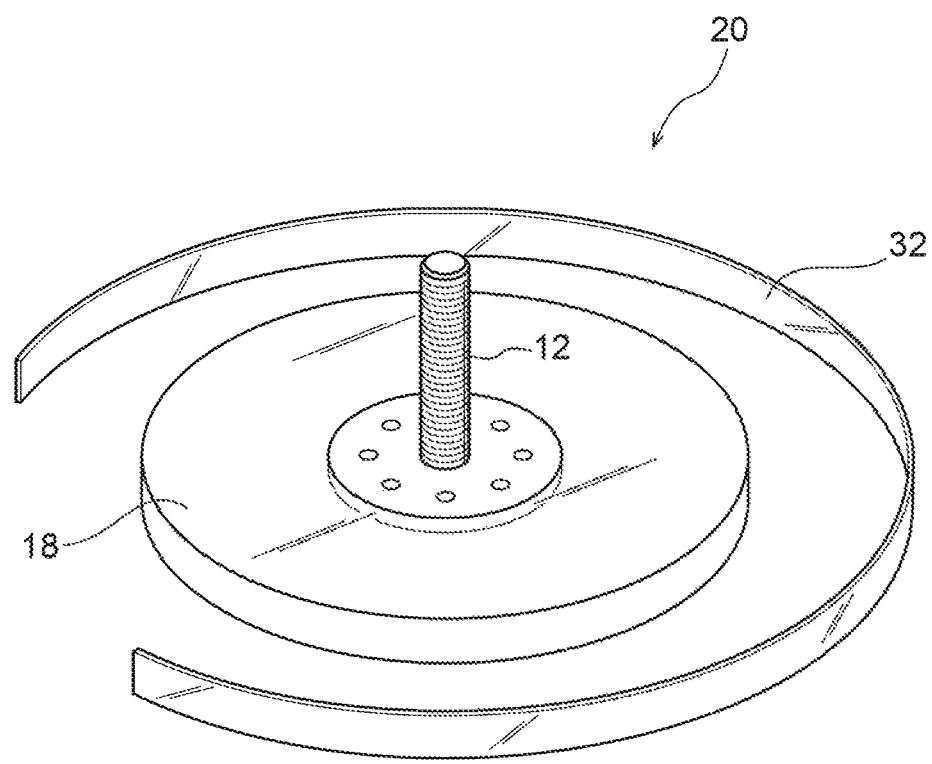
FIG. 4 is a perspective view showing the structure of a modified example of the joining structure of a resin member for a vehicle body and a stud bolt relating to the first embodiment.

A modified example of the above-described first embodiment is described next by using FIG. 4. This modified example has the feature that a "mirror finish tape 32" is used.

Concretely, the mirror finish tape 32 is strip-shaped, and is affixed to the peripheral edge portion of the resin member 18 for mounting in a state in which the mirror finish side is the flange-adjacent portion 18A side. In accordance with this structure, the ultraviolet rays UV that are irradiated onto the peripheral edge portion side of the resin member 18 for mounting are reflected at the mirror finish tape 32, and are irradiated toward the side of the adhesive A that is covered by the flange portion 12B of the stud bolt 12 as seen in a plan view. Accordingly, in the present modified example, the amount of ultraviolet rays that are irradiated onto the adhesive A can be increased by a simple structure.

Second Embodiment

A second embodiment of the joining structure of resin member for a vehicle body and a stud bolt relating to the present invention is described hereinafter by using FIG. 5. Note that structural portions that are the same as those of the above-described first embodiment are denoted by the same reference numerals, and description thereof is omitted.

Figure 5A:
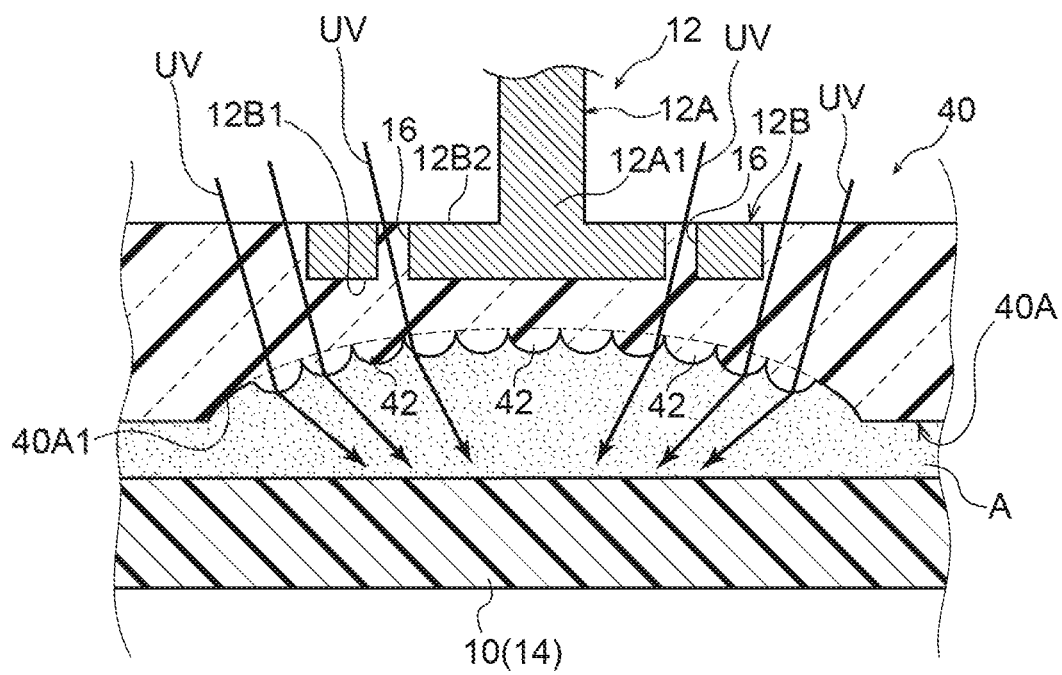
FIGS. 5A-5B illustrate the structure of a joining structure of a resin member for a vehicle body and a stud bolt relating to a second embodiment, where
Figure 5B:
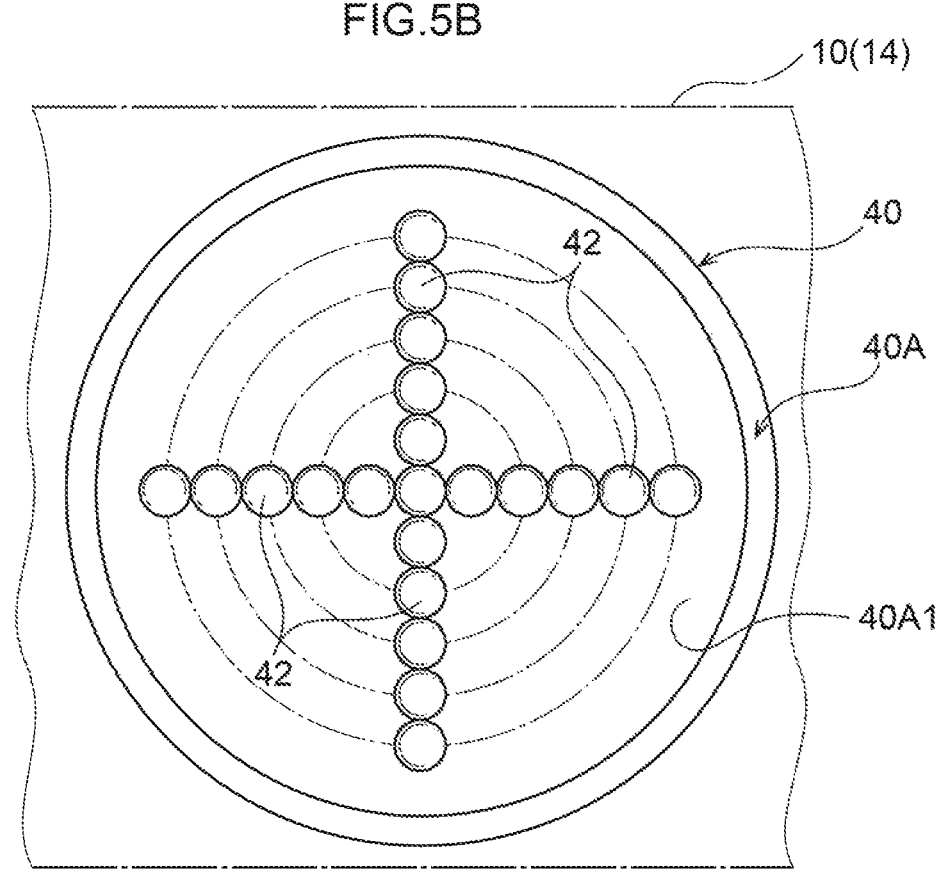

As shown in FIG. 5A, the second embodiment is basically structured similarly to the above-described first embodiment, but has a feature in the point that "hemispherical convex portions 42" are provided instead of the convex portions 22 at a "spherical concave portion 40A1" that is formed at a "mounting surface portion 40A" of a "resin member 40 for mounting". These hemispherical convex portions 42 are hemispherical shapes that are convex toward the resin member 10 side, and a plurality thereof are disposed in a dense state along the spherical, concave portion 40A1. More concretely, as shown in FIG. 5B, the plural hemispherical convex portions 42 are disposed so as to be adjacent in the peripheral direction of the spherical concave portion 40A1, and are disposed in plural rows in the radial direction of the spherical concave portion 40A1 as seen in a plan view.

In accordance with such a structure, the plural hemispherical convex portions 42 that are hemispherical and are convex toward the resin member 10 side are provided at the spherical concave portion 40A1 of the resin member 40 for mounting. Therefore, more ultraviolet rays UV can be irradiated onto the adhesive A, as compared with a case in which the hemispherical convex portions 42 are not provided. Concretely, the ultraviolet rays UV, which pass-through a vicinity of the peripheral edge portion of the flange portion 12B of the stud bolt 12, a ultraviolet rays UV, which are diffused and are irradiated between the flange portion 12B and the resin member 10, pass-through the hemispherical convex portions 42, and, due thereto, are converged toward the adhesive A that gathers in the spherical concave portion 40A1. Accordingly, in the present embodiment, the accuracy of curing the adhesive A that is covered by the flange portion 12B of the stud bolt 12 as seen in a plan view can be improved.

Third Embodiment

A third embodiment of the joining structure of a resin member for a vehicle body and a stud bolt relating to the present invention present is described hereinafter by using FIG. 6. Note that structural portions that are the same as those of the above-described first embodiment are denoted by the same reference numerals, and description thereof is omitted.

This third embodiment has the feature in the point that a "resin member 50 for mounting" is formed in the form of a planoconvex lens that is convex toward the other end portion 12A2 side of the shaft portion 12A of the stud bolt 12. In further detail, the focal point at the time when the resin member 50 for mounting functions as a lens is set at the resin member 10 side, and the ultraviolet rays UV that are irradiated from the stud bolt 12 side are converged at the central side of the resin member 50 for mounting as seen in a plan view and at the resin member 10 side. Further, in the present embodiment, a "spherical concave portion 50A1" is formed at a "mounting surface portion 50A" of the resin member 50 for mounting in the same way as in the above-described first embodiment, but the convex portions 22 and the like are not provided the spherical concave portion 50A1. Note that because the stud bolt 12 is molded integrally with the resin member 50 for mounting, an "extending portion 50C" contributes more to the functioning of the resin member 50 for mounting as a lens than the "flange-adjacent portion 50B" does. Further, because the spherical concave portion 50A1 is provided at the resin member 50 for mounting, the shape of the resin member 50 for mounting can be considered to be the shape of a convex meniscus lens, but the resin member 50 for mounting functions as a planoconvex lens.

In accordance with this structure, the ultraviolet rays UV that are irradiated onto the resin member 50 for mounting are converged toward the adhesive A that is covered by the flange portion 12B of the stud bolt 12 as seen in a plan view. As a result, in the present embodiment, the arising of an uncured portion of the adhesive A can be suppressed as compared with a case in which the resin member 50 for mounting is formed in the shape of a flat plate, or the like.

Fourth Embodiment

A fourth embodiment of the joining structure of resin member for a vehicle body a stud bolt relating to the present invention is described hereinafter by using FIG. 7. Note that structural portions that are the same as those of the above-described first embodiment are denoted by the same reference numerals, and description thereof is omitted.

In this fourth embodiment, a "resin member 60 for mounting" includes a "flange-adjacent portion 60A" and an "extending portion 60B", and is structured basically similarly to the above-described resin member 18 for mounting, but has a feature in the point that the densities of the resins that structure the resin member 60 for mounting differ in accordance with the region. Concretely, the resin that structures the extending portion 60B is structured by a resin whose density is relatively low, of the resins that structure the resin member 60 for mounting. The resins that structure the flange-adjacent portion 60A are structured by resins whose densities are relatively high, of the resins that structure the resin member 60 for mounting. Namely in the present embodiment, the resin member 60 for mounting is structured by plural types of resins having different densities.

Further, also with regard to the resins that structure the flange-adjacent portion 60A, regions 60A1 that overlap the through portions 16 that are formed in the flange portion 12B of the stud bolt 12 as seen in a plan view are structured by a resin whose density is relatively low, among the resins that structure that resin member 60 for mounting. Further, the boundary portions of the portions that have high density and the portions that have low density at the resins that structure the resin member 60 for mounting are diffused, and the densities of the resins gradually change at these boundary portions. Namely, when the extending portion 60B side is used as a reference, the density of the resin that structures the resin member 60 for mounting increases from the extending portion 60B side toward the flange-adjacent portion 60A side. Further, although not illustrated, a plurality of the above-described convex portions 22 or hemispherical convex portions 42 are formed at a spherical concave portion 60C1 that is formed at a mounting surface portion 60C of the resin member 60 for mounting. Note that a structure in which the convex portions 22 or the hemispherical convex portions 42 are not provided at the resin member 60 for mounting can also be employed, depending on the form of the resin member 60 for mounting the like.

In accordance with this structure, the density of the resin that structures the resin member 60 for mounting increases from the extending portion 60B side toward the flange-adjacent portion 60A side. Therefore, the ultraviolet rays UV that are irradiated toward the extending portion 60B side proceed while bending toward the flange-adjacent portion 60A side. Thus, in the present embodiment, the ultraviolet rays UV, which are irradiated toward the extending portion 60B side of the resin member 60 for mounting, can be converged toward the adhesive A that is covered by the flange portion 12B of the stud bolt 12 as seen in a plan view. Note that this is the same also for the ultraviolet rays UV that pass-through the through portions 16 of the flange portion 12B. Accordingly, in the present embodiment, arising of an uncured portion of the adhesive A can be suppressed without changing the shape of the resin member 60 for mounting.

Supplementary Description of Above-Described Embodiments (1) In the above-described embodiments, the through portions 16 are provided in the flange portion 12B of the stud bolt 12, but, in accordance with the type of stud bolt that is used, or the like, there may be a structure in which the through portions 16 are not provided. In this case, there may be a structure in which the convex portions 22 or the hemispherical convex portions 42 are provided only at the portion, which overlaps the peripheral edge portion of the flange portion 1 as seen in a plan view, of the mounting surface portion of the resin member for mounting.

(2) Further, in the above-described embodiment, there is a structure in which the spherical concave portion is provided at the resin member for mounting. However, in accordance with the amount of the adhesive A that is applied, or the like, there may be a structure in which the spherical concave portion is not provided.

(3) Moreover, in the above-described embodiment, there is a structure in which the resin member for mounting is structured of a transparent resin. However, the resin member for mounting may be structured of a resin that is not transparent, provided that ultraviolet rays can be transmitted therethrough. Further, in accordance with the structure of the resin member 10, the resin member 10 may be structured of a resin through which ultraviolet rays can be transmitted, and ultraviolet rays may be irradiated subsidiarily onto the adhesive A from the resin member 10 side.

(4) In the above-described first embodiment, the convex portions 22 are provided at the resin member 18 for mounting. However, in a case in which sufficient adhesive force of the adhesive A is obtained only by the through portions 16, there may be a structure in which the convex portions 22 are not provided.

(5) Further, in the above-described first embodiment, there may be a structure in which the surface area of adhesion of the mourning surface portion 18C with the adhesive A is increased by providing plural concave portions instead of the convex portions 22 at the resin member 18 for mounting. Moreover, there may be a structure in which the surface of the resin member 10 is roughened, or convex and concave portions are provided at the surface so as to increase the surface area of adhesion with the adhesive A.

(6) Moreover, the above-described second embodiment through fourth embodiment can be made to be structures in which the mirror finish tape 32 is affixed to the peripheral edge portion of the resin member for mounting.

What is claimed is:

1. A joining structure of a resin member for a vehicle body and a stud bolt, comprising:
   a resin member for a vehicle body that structures a portion of a vehicle body;
   a stud bolt that is made of metal and is structured to include a shaft portion at which a male screw portion is formed, and a flange portion that is plate-shaped and is provided integrally with the shaft portion at one end portion of the shaft portion; and
   a resin member for mounting that includes:
      a flange-adjacent portion, which is covered by the flange portion and is adjacent to a surface of the flange portion which surface is at a side opposite the shaft portion; and
      an extending portion, which is continuous with the flange-adjacent portion and extends-out from a peripheral edge portion of the flange portion as seen in a plan view, the resin member being formed of a resin through which ultraviolet rays can be transmitted and is provided integrally with the flange portion, and a mounting surface portion, which is provided at a side opposite the stud bolt, of the resin member for mounting being joined via an ultraviolet curable adhesive to the resin member for a vehicle body, and at least one of concave portions and convex portions being provided at a portion, which structures the flange-adjacent portion, of the mounting surface portion,
   wherein a spherical concave portion, which is spherical and covers a range that overlaps at least the flange portion as seen in a plan view and whose peak portion is positioned at a position overlapping the shaft portion as seen in a plan view, is formed at the mounting surface portion, and a plurality of hemispherical convex portions, which are hemispherical and are convex toward a side of the resin member for a vehicle body, are provided at a position of the spherical concave portion which position overlaps the peripheral edge portion of the flange portion as seen in a plan view.

2. The joining structure of a resin member for a vehicle body and a stud bolt of claim 1, wherein the resin member for mounting is formed in a shape of a planoconvex lens that is convex toward another end portion side of the shaft portion.

3. The joining structure of a resin member for a vehicle body and a stud bolt of claim 1, wherein a density of resin that structures the resin member for mounting becomes higher from the extending portion side toward the flange-adjacent portion side.

4. The joining structure of a resin member for a vehicle body and a stud bolt of claim 1, wherein a mirror finish tape is affixed to a peripheral edge portion of the resin member for mounting with the flange-adjacent portion side being a mirror finish side.

5. The joining structure of a resin member for a vehicle body and a stud bolt of claim 1, wherein at least one of flange portion side concave portions and flange portion side convex portions are formed at a joining surface portion, which is at a side of the resin member for mounting, of the flange portion.

6. The joining structure of a resin member for a vehicle body and a stud bolt of claim 1, wherein a plurality of through portions are formed in the flange portion.

7. The joining structure of a resin member for a vehicle body and a stud bolt of claim 6, wherein the resin member for mounting is formed in a shape of a planoconvex lens that is convex toward another end portion side of the shaft portion.

8. The joining structure of a resin member for a vehicle body and a stud bolt of claim 6, wherein a density of resin that structures the resin member for mounting becomes higher from the extending portion side toward the flange-adjacent portion side.

9. The joining structure of a resin member for a vehicle body and a stud bolt of claim 6, wherein a mirror finish tape is affixed to a peripheral edge portion of the resin member for mounting with the flange-adjacent portion side being a mirror finish side.

10. The joining structure of a resin member for a vehicle body and a stud bolt of claim 6, wherein at least one of flange portion side concave portions and flange portion side convex portions are formed at a joining surface portion, which is at a side of the resin member for mounting, of the flange portion.

* * * * *